United States Patent [19]

Bauer

[11] Patent Number: 5,029,919
[45] Date of Patent: Jul. 9, 1991

[54] PNEUMATIC SHOCK ABSORBER FOR AN AUTOMOBILE BUMPER HAVING VENTING MEANS

[76] Inventor: John K. Bauer, 510 Lenox Ave., Miami Beach, Fla. 33139

[21] Appl. No.: 481,608

[22] Filed: Feb. 15, 1990

[51] Int. Cl.⁵ .......................................... B60R 19/32
[52] U.S. Cl. ................... 293/134; 293/107; 293/124; 293/137; 267/221; 267/226; 188/287
[58] Field of Search ............... 293/107, 124, 132, 134, 293/135, 136, 137; 267/221, 226; 188/287

[56] References Cited

U.S. PATENT DOCUMENTS

| | | | |
|---|---|---|---|
| 1,799,065 | 3/1931 | Rohm | 293/134 |
| 1,807,132 | 5/1931 | Pappas et al. | 267/226 X |
| 1,925,461 | 9/1933 | Ridge | 267/226 X |
| 2,876,654 | 3/1959 | Sweitzer | 74/493 |
| 3,260,515 | 7/1966 | Albers | 188/287 X |
| 3,399,919 | 9/1968 | Brunt | 293/134 |
| 3,494,607 | 2/1970 | Rusch | 267/116 |
| 3,597,993 | 8/1971 | Rigley | 74/492 |
| 3,656,366 | 4/1972 | Somero | 74/492 |
| 3,729,221 | 4/1973 | Granig | 293/134 X |
| 3,768,850 | 10/1973 | Barton et al. | 293/110 |
| 3,801,087 | 4/1974 | Akaike et al. | 293/134 X |
| 3,804,446 | 4/1974 | Warrener | 293/134 |
| 3,841,683 | 10/1974 | Toro | 293/107 |
| 3,853,311 | 12/1974 | Kreuzer et al. | 267/64.26 |
| 3,933,386 | 1/1976 | Fannin | 293/134 |
| 3,938,840 | 2/1976 | Haase | 293/110 |
| 3,960,397 | 7/1976 | Janci | 293/107 |
| 3,971,583 | 7/1976 | Kornhauser | 293/110 |
| 3,972,551 | 8/1976 | Fannin | 293/134 |
| 4,097,080 | 6/1978 | Petry | 293/134 |
| 4,166,522 | 9/1979 | Bourcier de Carbon | 188/287 |
| 4,337,967 | 7/1982 | Yoshida | 280/777 |
| 4,624,493 | 11/1986 | Hillebrand | 293/136 |
| 4,674,354 | 6/1987 | Brand | 74/492 |
| 4,828,237 | 5/1989 | Neff | 267/221 |

FOREIGN PATENT DOCUMENTS 2146222  5/1979  Fed. Rep. of Germany ...... 188/287

Primary Examiner—Margaret A. Focarino
Assistant Examiner—Andrew C. Pike
Attorney, Agent, or Firm—Richard M. Saccocio

[57] ABSTRACT

A pneumatic energy absorbing arrangement, for use between the bumper and the frame of an automobile, includes a piston and cylinder combination which provides for an increasing amount of force or energy absorbed in relation to an increasing amount of travel between the piston and cylinder combination and, therefore, of the automobile itself. Exhaustion of the air within the piston cylinder combination is accomplished by a decreasing area of vent holes as the travel of the piston and cylinder increases. A specific or variable rate spring is provided to bias the piston and cylinder arrangement in an extended before-impact condition and absorb energy. The energy absorption device provided by this invention is reusable in that it is not destroyed during an impact.

9 Claims, 2 Drawing Sheets

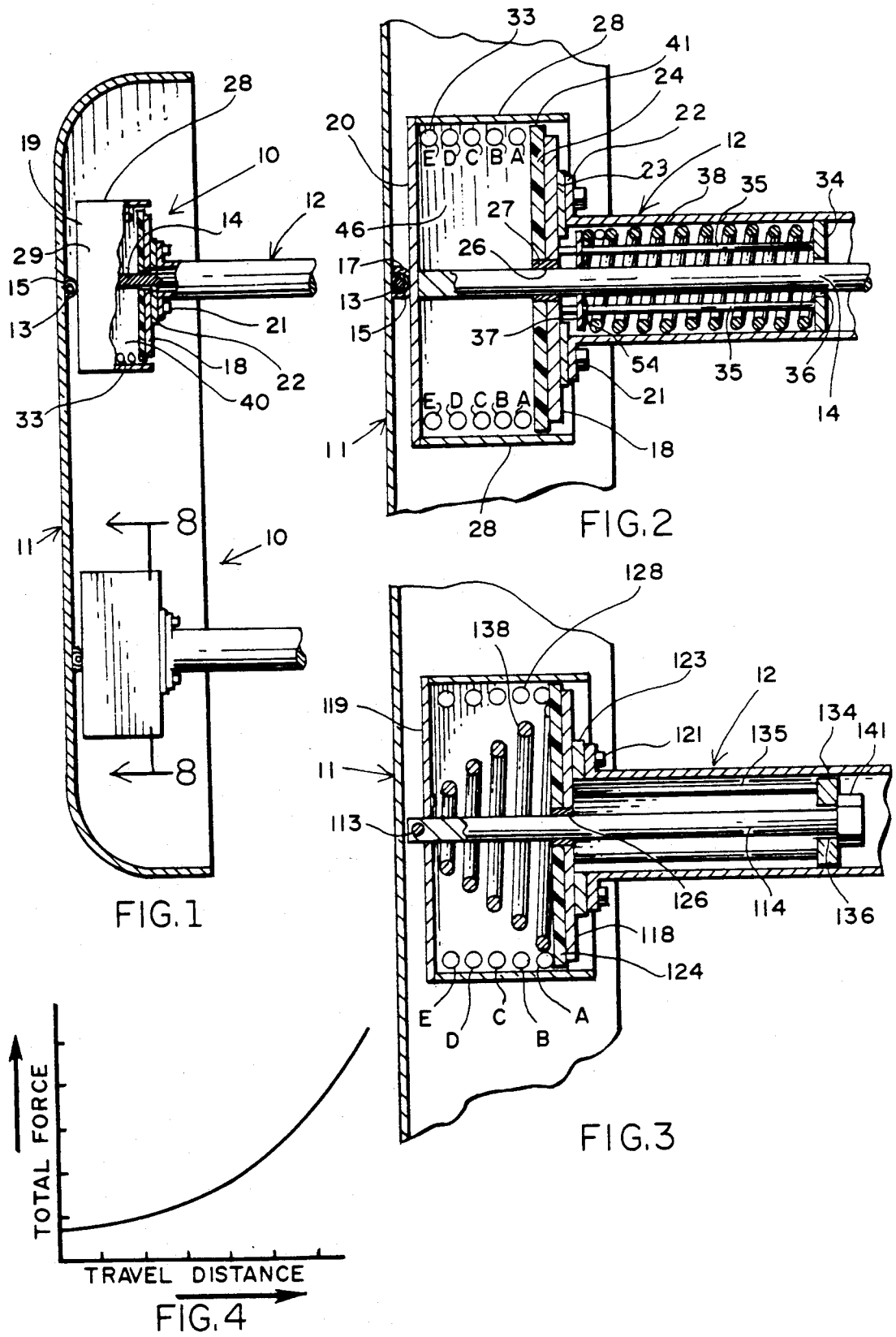

PNEUMATIC SHOCK ABSORBER FOR AN AUTOMOBILE BUMPER HAVING VENTING MEANS

BACKGROUND OF THE INVENTION

1. Field of the Invention

This invention relates in general to the field of energy absorbing systems for bumpers of automobiles designed to absorb the energy created during the impact of an automobile and in particular to a pneumatic energy absorbing shock absorber for connection between the bumper and the frame of an automobile.

2. Description of the Prior Art

There are many and different energy absorbing bumper arrangements for use with automobiles disclosed in the prior art as enumerated and described in the Applicant's Information Disclosure Statement Under 37 C.F.R. 1.56, which is incorporated herein by reference. In general the bumper systems of the prior art involve energy absorbing apparatus which is relatively complicated and, therefore, difficult to accurately predict the results thereof, difficult to fabricate because of the many parts involved, and to expensive in attempting to accomplish the desired result. What is needed is a simple but effective energy absorbing arrangement between the bumper and the frame of an automobile which increasingly absorbs the energy created during a collision so as to minimize the structural damage to the automobile as well as ensure the safety of the occupants of the automobile.

Accordingly, an objective of the present invention is to provide an energy absorbing bumper arrangement for an automobile wherein a relatively long energy absorbing stroke is used during the initial stages of a collision or of a collision which involves a relatively low velocity at impact which is customarily associated with vehicles impacting at a velocity of zero to approximately five miles per hour, and thereafter continually decreases the stroke in accordance with an increasing higher amount of energy being absorbed thereby.

Another object of the present invention is to provide an energy absorbing bumper arrangement for an automobile which provides for both low and high speed impact velocities and yet minimize the damage to the automobile and the occupants therein.

Another object of the present invention is to provide a pneumatic shock absorbing arrangement between the bumper and the frame of an automobile which provides for an increasing energy absorbing capability while decreasing the length of travel associated therewith.

Another object of the present invention is to provide an energy absorbing bumper arrangement for use with an automobile which can withstand a number of automobile impacts and yet still be functional in the event of yet another automobile impact.

Another object of the present invention is to provide an energy absorbing arrangement for the bumper of an automobile which is simple in design, construction and attachment, yet is relatively inexpensive to construct and install.

Another object of the present invention is to provide an energy absorbing arrangement for an automobile which comprises a single assembly which may be initially installed and replacement installed as a single assembly.

The above-stated objects as well as other objects which, although not specifically stated, but are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention accomplishes the above-stated objectives as well as others, which are apparent from a fair reading and interpretation of this specification, as well as others not stated, by providing an energy absorbing pneumatic bumper arrangement for use with a motor vehicle which utilizes ordinary air during operation and provides for an increasing level of energy absorption in association with a decreasing amount of travel of the motor vehicle in coming to rest after impact.

In the present invention a pneumatic energy absorbing arrangement is provided between the bumper and the frame of an automobile or other motor vehicle. In a preferred embodiment, two such energy absorbing pneumatic arrangements are provided at the front and at the rear of an automobile with one unit being located between the center and the end of the bumper on each side of the automobile. The attachment of each of the units to the bumper and the operation of the energy absorbing apparatus of the automobile is such that it reasonably provides for off center strikes of the automobile bumper.

A spring is utilized in conjunction with the piston of a pneumatic cylinder arrangement so as to bias the piston in a extended or open position relative to the cylinder thereof. Also, a number of air vents are associated with the piston and cylinder combination to allow the air within the cylinder to escape during an automobile collision. Upon initial impact, a relatively large amount of air vents are provided, which in operation with the spring rate of the spring results in relatively large initial deflections versus relatively small impact loads. As the deflection of the pneumatic cylinder and the spring associated therewith continues, lesser and lesser amounts of air are allowed to escape from the arrangement and, in conjunction with the spring rate of the spring, provides for an increasing amount of energy absorption with a decreasing amount of travel. In other words, an increasing amount of force is absorbed by the shock absorbing bumper arrangement in conjunction with a decreasing length of travel of the piston relative the cylinder.

BRIEF DESCRIPTION OF THE DRAWINGS

Various other objects, advantages, and features of the invention will become apparent to those skilled in the art from the following discussion taken in conjunction with the following drawings, in which:

FIG. 1 comprises a plan view of a preferred embodiment of the invention illustrating the connection of the pneumatic cylinder arrangement with the bumper and the frame of an automobile;

FIG. 2 illustrates a plan view of one embodiment of the energy absorbing arrangement of FIG. 1 shown in an enlarged view hereof;

FIG. 3 illustrates a plan view of another embodiment of the energy absorbing arrangement of FIG. 1 shown in an enlarged view thereof.

FIG. 4 is a graph which schematically shows the increasing amount of energy being absorbed versus a decreasing length of travel;

DESCRIPTION OF THE PREFERRED EMBODIMENTS

Figure 5:
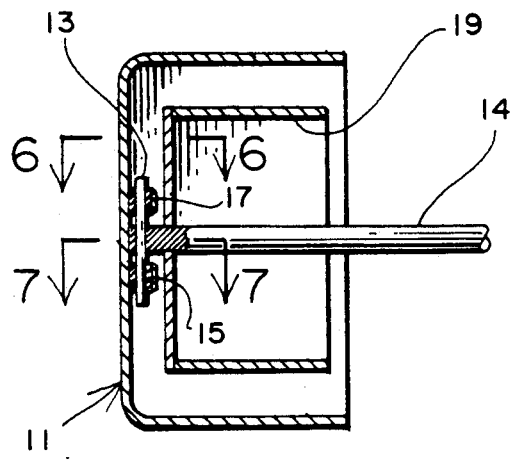
FIG. 5 illustrates a side view of a typical energy absorbing arrangement with a particular emphasis on the connection of the same to the bumper of an automobile.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

In FIG. 1 of the drawings, there is shown dual pneumatic piston cylinder arrangements 10, each attached at one end to bumper structural member 11 and at the other end to the frame horn 12 of an automobile frame. Although not shown in the drawings, it is to be realized that with today's modern cars, a plastic cover panel is attached to and surrounds the outside of the bumper structural member 11.

The attachment of the front part of piston-cylinder arrangement 10 to the bumper is a flexible connection. Pin 13 and rubber bushing 15 connect piston rod 14 to bumper 11. The attachment of the rear portion of piston cylinder arrangement 10 to the frame horn 12 of the frame of an automobile comprises a rigid connection. The frame horn 12 is rigidly connected to piston 18. The piston rod 14 is fixedly attached to the cylinder section 19 of piston cylinder arrangement 10.

While in FIG. 1 it is shown that the piston remains stationary while the cylinder and the connecting rod move axially with respect thereto, an alternative arrangement is readily envisioned (but not shown) whereby the cylinder may be held stationary with regard to the frame horn 12 while the piston and the rod move axially in accordance with the motion of bumper 11.

FIG. 1 also shows the use of two piston cylinder arrangements 10 with regard to either a front or a rear bumper of an automobile. However, the invention is not to be limited thereby. For example, one centrally arranged shock absorbing unit 10 may be utilized or, in the alternative, three or even more shock absorbing arrangements 10 can be utilized with a single bumper 11.

FIG. 2 illustrates an enlarged view, partially in cross section, of one embodiment of the pneumatic piston cylinder arrangement 10. Piston 18 comprises a flat plate having an approximate rectangular configuration. Piston 18 is rigidly attached to a flange 22 on frame horn 12 by bolt arrangement 21.

A reinforcing-backing plate 23 may be interposed between piston plate 18 and frame horn 12. A rubber, or other like material, pad 24 is placed in front of piston plate 18. Rubber pad 24, like piston plate 18, is rectangular but extends over the peripheral edge of piston plate 18 by approximately one-quarter of an inch. The clearance 41 around rubber pad 24 (between the peripheral edge of rubber pad 24 and the inside of cylinder 19) may be of the order of between 1/16 to ⅛ of an inch. Bolt arrangement 21 may be used to joint together frame horn 12, backing plate 23, piston plate 18 and rubber pad 24, all of which include a central opening 26 through the geometric center thereof for piston rod 14. A TEFLON ® (a synthetic resin polymer) or other like material, bushing 27 is fitted within opening 26 for purposes of allowing piston rod 14 to freely slide therethrough.

Cylinder 19 comprises a rectangular box member having a front panel 20 rigidly connected to side panels 28 and top and bottom panels 29. The front plate 20 of cylinder 19 is rigidly connected to piston rod 14 such as by welding 16 (FIG. 6). Piston rod 14 extends through the front panel 20, which extension includes a transverse through hole 32 for purposes of connecting cylinder 19 and piston rod 14 to bumper member 11 by pin 13. See FIGS. 5, 6, and 7. Thus, cylinder 19 and piston rod 14 move with bumper member 11 upon impact. A plurality of holes 33 are provided in one or more rows of cylinder 19 along side 28 or bottom 29 panels for purposes of venting the air trapped within cylinder 19 upon movement of bumper 11 caused by a collision. As cylinder 19 moves relative to piston 18, fewer and fewer holes 33 are available for venting of the trapped air. This venting, in part, accomplishes the absorption of energy resulting from a collision.

Again referring to FIG. 2, it is seen that piston rod 14 also extends out of and away from piston plate 18. A remote spring retaining plate 34 is rigidly attached to piston plate 18 by struts 35 such as by welding or threading. Piston rod 14 extends through remote retaining plate 34 and slides with respect thereto through another TEFLON ® (a synthetic resin polymer) bushing 36. A spring retaining near plate 37 is rigidly attached to piston rod 14 at a location substantially adjacent to piston plate 18. An energy absorbing spring 38 is fitted between near plate 37 and remote plate 34. Spring 38 functions to bias piston plate 18 and cylinder 28 in a spaced apart position as shown in FIG. 2. Struts 35 limit the remote location of remote plate 34 and therefore the compression of spring 38. In this manner, a ready to function (to absorb the energy of a collision) unit comprising cylinder 19, piston 18, piston rod 14, and spring 38 and which further comprises a single assembly, may be connected as a complete assembly between the bumper 11 and the frame horn 12 of an automobile. This single unit feature is very advantageous from an initial assembly and a replacement assembly standpoint.

In operation, when the bumper 11 is struck and moves rearward relative to frame horn 12, the energy of the impact of the vehicle associated with the piston and cylinder arrangement 10 as the vehicle comes to rest is absorbed by the pneumatic piston cylinder arrangement 10. The motion of the bumper is translated to the connecting rod 14 through the pin 13 which results in axial motion of both rod 14 and cylinder 19 relative to piston plate 18 and remote spring retaining plate 34. Piston assembly 18 remains stationary relative to the frame horn 12 by means of the connection of it to the frame horn 12 by the bolt arrangement 21. Upon initial impact, the air within the space 40 defined by cylinder 19 escapes through the peripheral opening 41 around rubber pad 24 as well as all of the holes 33, and spring 38 begins to compress. Thus, upon initial impact, a relatively large amount of motion is associated with a relatively small amount of energy absorption. As the impact continues, however, the piston arrangement sequentially covers holes 33A and 33B and begins approaching the location of holes 33C and then 33D which are continuously exhausting air within cylinder 19. Then, when holes 33D are completely covered by the motion of cylinder 19, the last holes 33E as well as the peripheral opening 41 are then all that is available to exhaust the air within cylinder 19. The decreasing amount of openings for the exhaust of air within cylinder 19 in conjunction with the relatively rapid travel of bumper 11 relative to frame horn 12 provides a force deflection curve which is increasing as the amount of deflection increases. This may be seen in FIG. 4. The force deflection curve of spring 38 also operates in this direction. It is also to be noted that inasmuch as the impact causes very quick movement of the piston 18 relative to cylinder 19 such that the pressure of the air within cylinder 19 also increases with travel of cylinder 19 relative to piston 18. This action further enhances the increasing force required for a corresponding increase in deflection. Variations in the energy-absorbing curve can be obtained by progressively decreasing the size of holes 33A through 33D and/or by providing a variable rate spring 38.

FIG. 3 illustrates another embodiment of the pneumatic energy absorbing arrangement provided by this invention. In this embodiment, a piston cylinder arrangement 110 is again provided in a single unit which may be fitted between bumper 11 and frame horn 12.

The spring 138 is provided between cylinder 119 and piston 118 and is seen to be shaped in a circular cone. This shape of spring 138 provides for the minimum compressed height of the spring being the thickness of one coil. That is, when compressed, the coils of spring 138 each fit within the other and form a flat concentric coil when fully compressed. The respective parts in the embodiment of FIG. 3 function as their counterparts in the embodiment of FIG. 2. Thus, in operation, the embodiment of FIG. 3 functions as that of FIG. 2.

Figure 6:
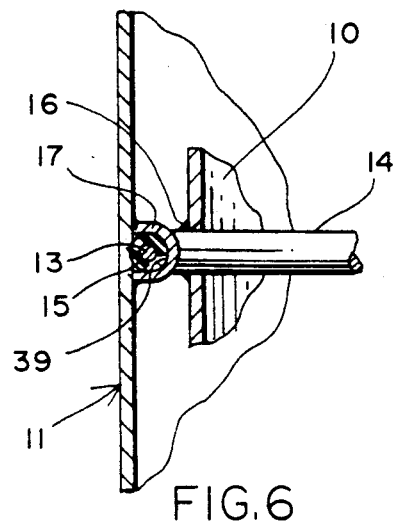
FIG. 6 is an enlarged cross-sectional view taken along the line 6—6 of FIG. 5.
Figure 7:
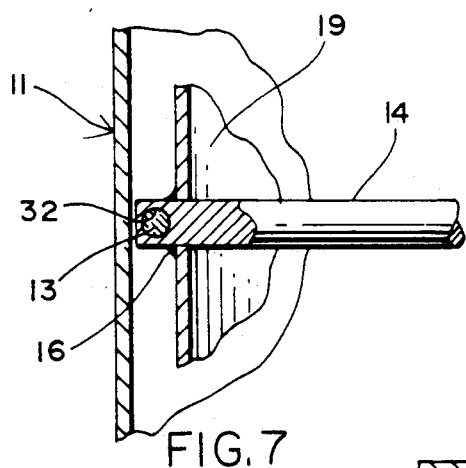
FIG. 7 is an enlarged cross-sectional view taken along the line 7—7 of FIG. 5; and, FIG. 8 is a cross-sectional view taken across the line 8—8 of FIG. 1.
Figure 8:
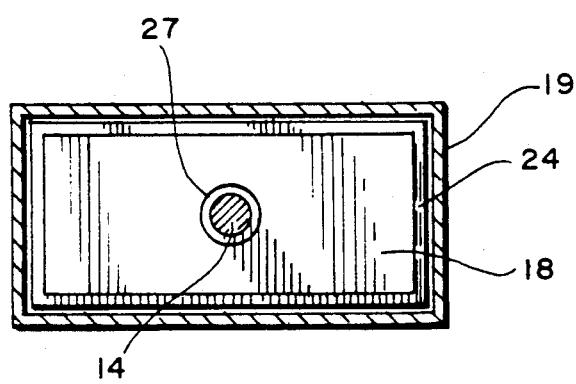

FIGS. 5, 6, and 7 show details of the flexible connection between bumper 11 and piston rod 14. A bracket 17 having an opening 39 therethrough is rigidly attached such as by welding to bumper 11. Opening 39 is aligned with opening 32 through the extending portion of piston rod 14 such that pin 13 fits therein. A rubber sleeve 15 is fitted between pin 13 and openings 32 and 39. Rubber sleeve 15 in conjunction with pin 13 provide for off center hits of bumper 11. That is, collisions which may, for example, occur more or less on either the right side or the left side of the automobile such that the side that is hit deflects more than the other side. This causes the bumper 11 to become angled relative to the automobile. Compression of sleeve 15 and rotation about pin 13 allow for such movement on either the left or right side of the bumper.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the scope of the breadth and scope of the claims here appended.

I claim as my invention:

1. A collision shock absorbing system for a motor vehicle comprising;
    air operable piston and cylinder apparatus having energy absorption means associated therewith which absorbs an increasing amount of force in accordance with a decreasing travel distance of said piston relative to said cylinder,
    said energy absorbing means comprising a plurality of holes in a wall of said cylinder, said holes being axially arranged such that travel of said piston relative to said cylinder results in a decreasing number of holes being available within said cylinder through which air may be expelled,
    said piston including a piston rod having spring means associated therewith for biasing said piston and cylinder in an apart position,
    said piston comprising a flat plate with a first clearance space between a peripheral edge of said piston and an inside wall of said cylinder; and,
    a rubber plate mounted against said piston plate with a second clearance space between a peripheral edge of said rubber plate and said inside wall of said cylinder.

2. The energy absorbing apparatus of claim 1, further comprising a bumper and a frame horn with said piston and cylinder combination being interposed therebetween.

3. The energy absorbing apparatus of claim 1, wherein said rubber plate extends beyond said peripheral edge of said piston plate by an approximate distance of one-quarter of an inch.

4. The energy absorbing apparatus of claim 3, wherein said second clearance space between said peripheral edge of said rubber plate and said inside wall of said cylinder is approximately between a range of one-sixteenth to one-eighth of an inch.

5. The energy absorbing apparatus of claim 1, wherein said cylinder and said piston have a substantially rectangular cross-sectional shape transverse to a direction of said relative travel of said piston and cylinder combination.

6. The energy absorbing apparatus of claim 1, further comprising a coiled conically-shaped spring interposed between said piston and said cylinder for biasing said piston and cylinder in an open position.

7. The energy absorbing apparatus of claim 1, further comprising said piston rod extending through a front plate of said cylinder and being attached to said bumper by a pin fitting transversely through a hole in said piston rod.

8. The energy absorbing apparatus of claim 7, wherein said transverse pin includes a flexible rubber-like outer sleeve.

9. A collision shock absorbing system for a motor vehicle comprising:
    air operable piston and cylinder apparatus having energy absorption means associated therewith which absorbs an increasing amount of force in accordance with a decreasing travel distance of said piston relative to said cylinder,
    said energy absorbing means comprising a plurality of holes in a wall of said cylinder, said holes being axially arranged such that travel of said piston relative to said cylinder results in a decreasing number of holes being available within said cylinder through which air may be expelled, said piston including a piston rod having spring means associated therewith for biasing said piston and cylinder in an apart position; and, said piston rod extending outward from said piston away from said cylinder with a near plate fixed thereto and a remote plate fixed to said piston and a spring therebetween, said spring biasing said piston and cylinder in an apart position.

* * * * *